United States Patent
Kimberg et al.

Patent Number: 5,904,999
Date of Patent: May 18, 1999

[54] AIR-COOLED METAL-AIR BATTERY

[75] Inventors: Sergey Kimberg; Yoel Gilon; Yaron Shrim; Vladimir Schneider, all of Jerusalem, Israel

[73] Assignee: Electric Fuel (E.F.L.) LTD., Jerusalem, Israel

[21] Appl. No.: 08/987,518

[22] Filed: Dec. 9, 1997

Related U.S. Application Data

[63] Continuation-in-part of application No. 08/451,012, May 25, 1995, Pat. No. 5,753,384.

[51] Int. Cl.$^6$ ........................................................ H01M 8/04
[52] U.S. Cl. .................................. 429/27; 429/26; 429/34; 429/38
[58] Field of Search ................................ 429/26, 27, 34, 429/38, 39, 72

[56] References Cited

U.S. PATENT DOCUMENTS 5,230,966   7/1993   Voss et al. .
5,354,625   10/1994   Bentz et al. .

*Primary Examiner*—John S. Maples
*Attorney, Agent, or Firm*—Helfgott & Karas, P.C.

[57] ABSTRACT

The invention provides An electrochemical zinc-air multi-cell battery, each cell being of the type provided with a housing having, two outer major surfaces, and two spaced-apart inner walls, the inner walls defining a first inner chamber for containing therein a zinc electrode, and in conjunction with the outer major surfaces defining two outer chambers for receiving reaction air; two generally planar, gas-permeable, but liquid-impermeable air electrodes, each of the electrodes being installed in a window-like opening provided in each of the inner walls, an electrolyte in contact with the zinc electrode and the air electrodes, means for directing a flow of the reaction air into a first inlet provided in a first outer side surface of the housing through both of the outer chambers substantially in a uniform flow distribution across the outer faces of both of the air electrodes, and out of a second outlet provided in an opposite outer side surface of the housing, and cooling air flow directing means for causing cooling air to flow between two adjacently positioned cells, along the outer faces of the major surfaces of two interfacing adjacent cells, the surfaces respectively being arranged to be in contact with and to cool the reaction air in each of the outer chambers bounded by the respective surfaces.

14 Claims, 4 Drawing Sheets

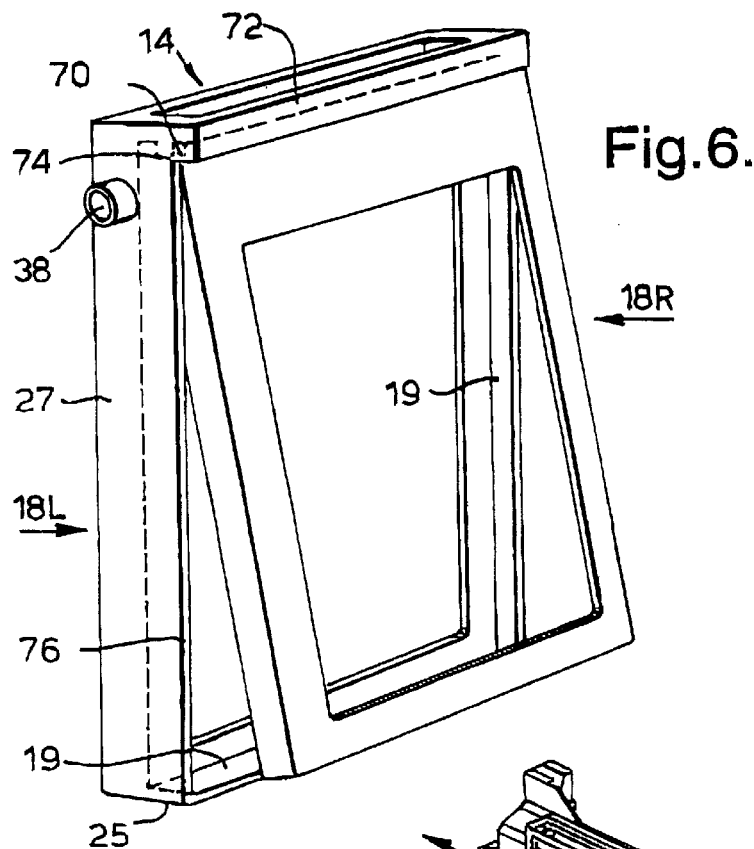
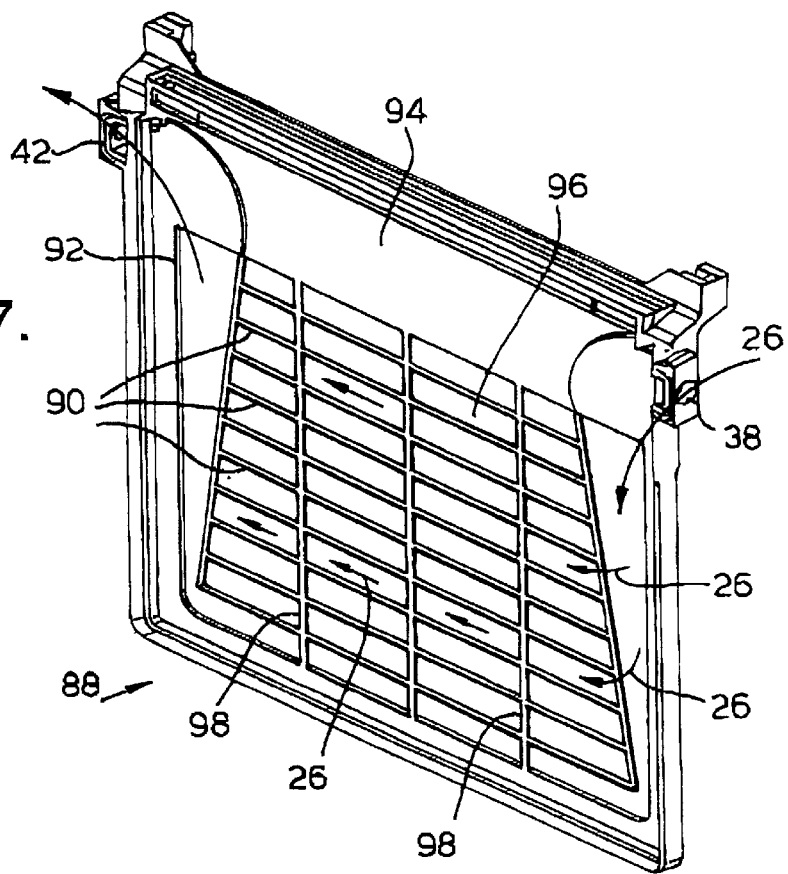

AIR-COOLED METAL-AIR BATTERY

BACKGROUND OF THE INVENTION

The present specification is a continuation in part of U.S. Ser. No. 08,451,012, filed May 25th 1995, now U.S. Pat. No. 5,753,384.

The present invention relates to a cooled metal-air battery.

More particularly, the invention provides a reliable air-cooling device suitable for extracting large quantities of heat from a mechanically rechargeable zinc-air battery intended for vehicle propulsion.

All electric batteries generate heat during operation, one source thereof being the chemical reaction taking place in the cells, and the second source being the current flow meeting the ohmic resistance of the battery itself. In most batteries, such heat is dissipated naturally, mainly by convection. However, batteries designed to power electric vehicles are designed to provide high power from a compact battery envelope, and may exhibit a high temperature rise if no additional provision is made for cooling. Further aggravating the problem is the consideration that road vehicles need to be designed to allow operation in ambient temperatures as high as 45–50° C.; under such conditions, the generated heat may raise battery temperature to a level causing battery damage.

While a high operating temperature is not necessarily detrimental to battery performance, there are several reasons justifying some cooling arrangement in a battery of this type. First, in a naturally cooled battery, the inner cells will operate at a considerably higher temperature than those on the battery perimeter, leading to operating differentials between the cells. Second, it is often advantageous to use the heat removed from the battery for heating the passenger compartment of the vehicle, when required. Third, premature deterioration due to heat of solid and liquid materials in the battery must be prevented.

Cooling systems for electric batteries are described in U.S. Pat. Nos. 754,969; 3,767,468; 4,007,315; 4,463,064; 4,578,324; and 5,212,024. These specifications disclose various systems for circulating a cooling gas such as air, or a liquid such as water, through the battery for removing heat therefrom.

Cooling systems for the electrolyte are described in U.S. Pat. Nos. 3,290,176; and 5,093,213. While such systems have certain advantages, particularly in achieving electrolyte mixing to even out concentration differences, these systems require pumping means and are more complex and heavier than systems using direct air cooling. Surprisingly, electrolyte cooling systems extract only about 40 watts of heat from each battery cell of a size approximately 24 cm by 24 cm, e.g., one suitable for use in a battery for road vehicle propulsion.

Systems designed to have a flow of cooling air directed across the tops of metal current collector frames only maintain a removal capacity of about 20 watts for the above-mentioned battery cell size, which is approximately only 25% of the capacity needed in a practical road-vehicle propulsion battery. It is possible to increase the flow rate of reaction air contacting the air electrodes sufficiently to remove any excess heat by using a large blower. This arrangement is well-suited for short-term use, for example, in batteries for torpedo propulsion, which have an operating life of only a few minutes. However, if the air flow rate across the air electrode is much in excess of that required to supply reaction oxygen, it will eventually cause the drying out of the electrolyte from the air electrode, which will cause the cell to have an unacceptable power loss.

Since air contains about 0.0314% by volume of carbon dioxide, which gas is known to be detrimental to a high efficiency operation of metal-air cells, this causes a further impediment to increasing the flow of reaction air sufficiently for use as a cooling medium. Accordingly, the present inventors have proposed a form of scrubber device suitable for use in conjunction with batteries, as described in U.S. Pat. No. 5,595,949. Scrubber devices for removal of $CO_2$ usually involve the use of a $CO_2$-absorbent material, for example, granular alkali metal hydroxide or aqueous alkali metal hydroxide absorbed on a porous carrier. No matter whichever absorber material is used, the absorber will become chemically exhausted after extensive use, and require replacement or chemical recharging. Premature absorber exhaustion may be avoided by using the scrubber only for processing the quantity of air containing sufficient oxygen for battery reaction. However, the quantity of air required for battery operation has been found insufficient for achieving a high rate of cooling.

OBJECTS OF THE INVENTION

It is therefore one of the objectives of the present invention to provide a zinc-air battery which has a heat extraction capacity system sufficient to remove a minimum of 50 watts of heat from each cell of a battery size used in a road vehicle propulsion battery.

Also, it is a further objective of the present invention to remove heat from the air adjacent to the major surfaces of battery cells by use of an air cooling system.

In U.S. Pat. No. 5,753,384 there is described and claimed an electrochemical zinc-air multi-cell battery, each cell being of the type provided with a housing having a base and two major surfaces and two minor surfaces defining an interior space for containing therein a zinc electrode; at least one generally planar gas-permeable but liquid-impermeable air electrode, each of said least one air electrode being installed in a window opening provided in at least one of the major surfaces; an electrolyte in contact with said zinc electrode and said air electrode; means for directing a flow of reaction air from a scrubber across the outer faces of two adjacently interfacing air electrodes; and cooling-air, flow-directing means comprising a pair of spaced-apart plates positioned between adjacent cells, each plate being substantially the same size as said major surfaces for forcing cooling-air to flow between said pair of plates, the outer faces of said plates being arranged to be in contact with and to cool said reaction air.

SUMMARY OF THE INVENTION

According to the present invention, there is now provided an electrochemical zinc-air multi-cell battery, each cell being of the type provided with a housing having two outer major surfaces, and two spaced-apart inner walls, said inner walls defining a first inner chamber for containing therein a zinc electrode, and in conjunction with said outer major surfaces defining two outer chambers for receiving reaction air; two generally planar gas-permeable, but liquid-impermeable air electrodes, each of said electrodes being installed in a window-like opening provided in each of said inner walls; an electrolyte in contact with said zinc electrode and said air electrodes; means for directing a flow of said reaction air into a first inlet provided in a first outer side surface of said housing through both of said outer chambers substantially in a uniform flow distribution across the outer faces of both of said air electrodes, and out of a second outlet provided in an opposite outer side surface of said housing; and cooling air flow directing means for causing cooling air to flow between two adjacently positioned cells, along the outer faces of the major surfaces of two interfacing adjacent cells, said surfaces respectively being arranged to be in contact with and to cool said reaction air in each of the outer chambers bounded by said respective surfaces.

In a preferred embodiment of the present invention said cooling air flow directing means include blower means.

In another preferred embodiment of the present invention said cooling air flow directing means include vent means provided in said housing for directing natural air flow between said cells.

It will be appreciated that the battery of the present invention has arrangements for two separate air flows, heat being transferred from the reaction air to the cooling air. The two air flows may, however, originate from a single air blower. Reaction air is supplied in sufficient quantity to operate the battery, while a larger quantity of cooling air is used to extract unwanted heat from the reaction air.

Tests have been carried out on a battery having cells sized 24 cm by 24 cm and it has been found that while using the arrangement of the present invention, up to 80 watts of heat can be extracted from each cell. Such a result is adequate for the satisfactory operation of a compact, high-power battery necessary for economic operation in road-vehicle propulsion.

In especially preferred embodiments of the present invention said outer major surfaces of the housing are made of plastic material. It is to be noted that plastics are usually not considered as suitable candidates for use in heat-exchange applications, as metals have heat conductivities which are approximately a thousand times larger than typical solid plastics. This consideration is, however, based on an over-simplified view of what actually transpires when heat is transferred by conduction through a wall. Both the hotter and the cooler surface of the wall are covered by a thin film of the respective medium, air in the present application, in contact which such a wall. The value of the film coefficient depends on many factors, among them thermal conductivity, viscosity, density and specific heat. Precise calculations are complex, but, as a rule, unless flow is turbulent and the heat exchange wall is thick, the resistance to heat flow of each single film is typically many times greater than the resistance of the solid material comprising the wall; there are, of course, two such air films, and the thin film of still air which is in close contact to the wall is a very poor heat conductor.

This consideration is of particular effect in the present invention, where the wall thickness of said outer major surface is very small, approximately one millimeter, and due to limitations on blower power consumption, air flows are expected to be laminar. The end result is that when total heat resistance is considered, and not merely the heat conductivity of the wall material, a thin wall made of a solid plastic is only moderately inferior to a metal in this application.

Plastics have several compensating attractive properties for use in the outer surfaces of the housing in the present invention, such as electrical resistance, light-weight, low fabrication costs and excellent resistance to chemical attack by the alkaline medium prevalent in batteries of the type described. For example, in comparing an equal thickness of copper to polypropylene, the plastic offers a weight advantage of a factor of 9.9. Such an advantage is of considerable importance in a battery intended for road vehicle propulsion, wherein low weight is a crucial requirement for attaining acceptable vehicle performance.

In a most preferred embodiment of the present invention, there is provided a zinc-air battery wherein the flow rate of said cooling air exceeds the flow rate of said reaction air by a factor of at least two.

In especially preferred embodiments of the present invention, said zinc-electrode is formed of a generally planar electrically conductive skeletal member encompassed by an active metal component, comprising porous zinc particles formed into a static bed of slurry impregnated with an electrolyte and said interior space of said housing communicates with an opening opposite said base through which said zinc electrode is removable to enable the mechanical replacement thereof with a freshly charged metal electrode.

In U.S. Pat. No. 5,354,625 there is described and claimed a metal-air power supply and air-manager system and a metal-air cell for use therein. However said patent teaches a zinc-air cell with an air electrode cathode on top and a solid cell case on the bottom, wherein the reaction air is directed to a cathode plenum above the top of the cell, while the cooling air is directed to a cooling-air plenum at the bottom of the cell. Thus, it is clear that this patent does not teach or suggest the use of cooling air to cool reaction air, but rather directs the cooling air to a different face of the cell, i.e. one which has no air cathode.

As stated specifically in column 6, lines 6–13 of said patent, "In addition, the stackable tray registers of the cell are formed within the component so the cell cases and the trays form a cathode plenum in each compartment adjacent to the respective air cathode and a cooling air plenum isolated from the air cathode, whereby reactant air may be directed against the air cathodes and cooling air may be directed against a portion of each cell case isolated from the respective air cathode".

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

In the drawings:

FIG. 6 is a view of a cell detail of two spaced-apart inner walls provided with a long ridge projection to form a sealed unit; and FIG. 7 is a perspective view of an embodiment provided with means for directing the flow of reaction air in a uniform flow distribution across outer faces of the air electrodes.

DESCRIPTION OF THE INVENTION

Figure 1:
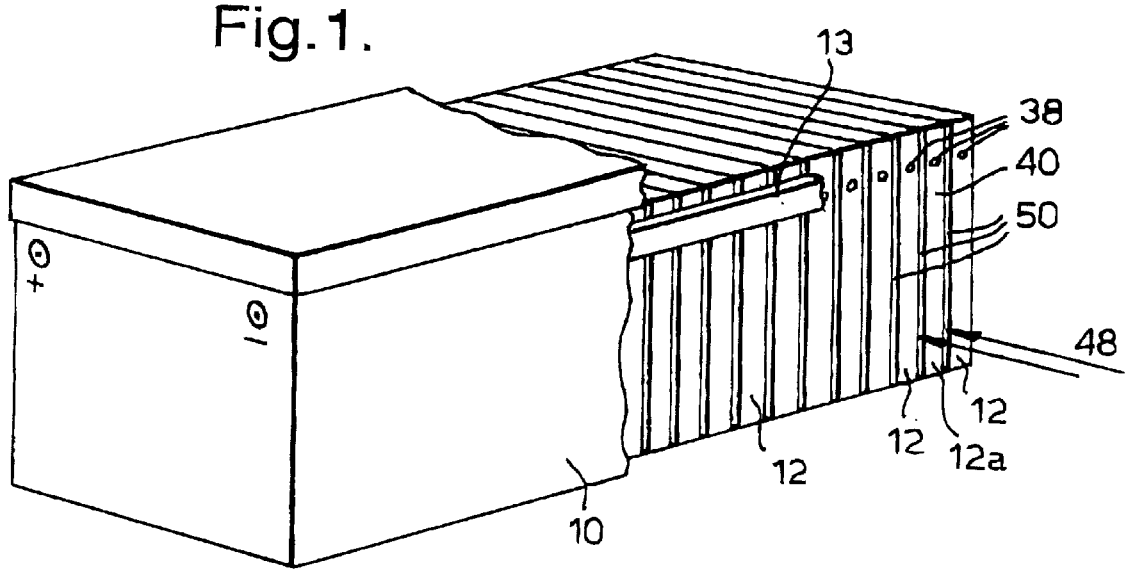
FIG. 1 is a perspective, non-detailed fragmented view of a preferred embodiment of the cooled battery according to the invention.

There is seen in FIG. 1 an electrochemical zinc-air multi-cell battery 10, of the type used for multiple discharge and recharge cycles. Battery 10 contains many cells 12, 12a, and is suitable for vehicle propulsion.

Figure 2:
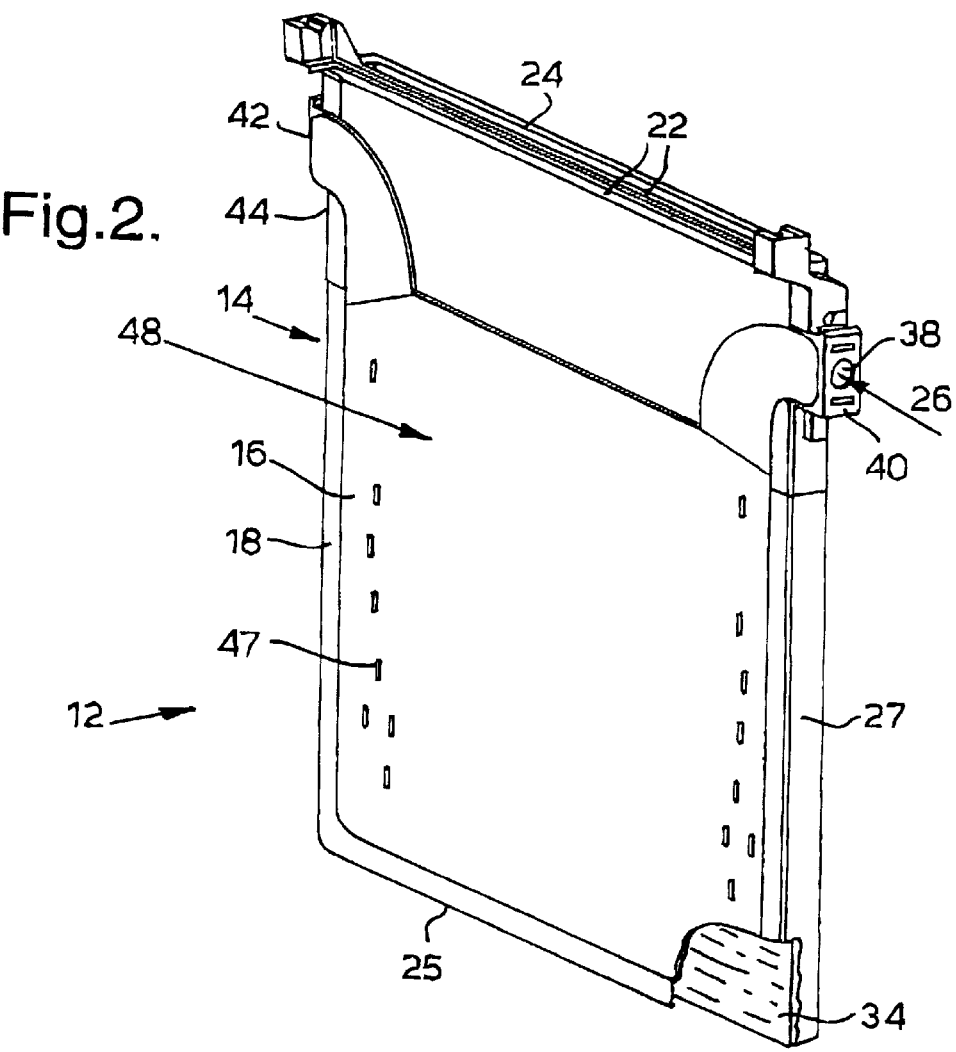
FIG. 2 is a perspective, fragmented view of one of the battery cells, showing contained electrolyte.
Figure 3:
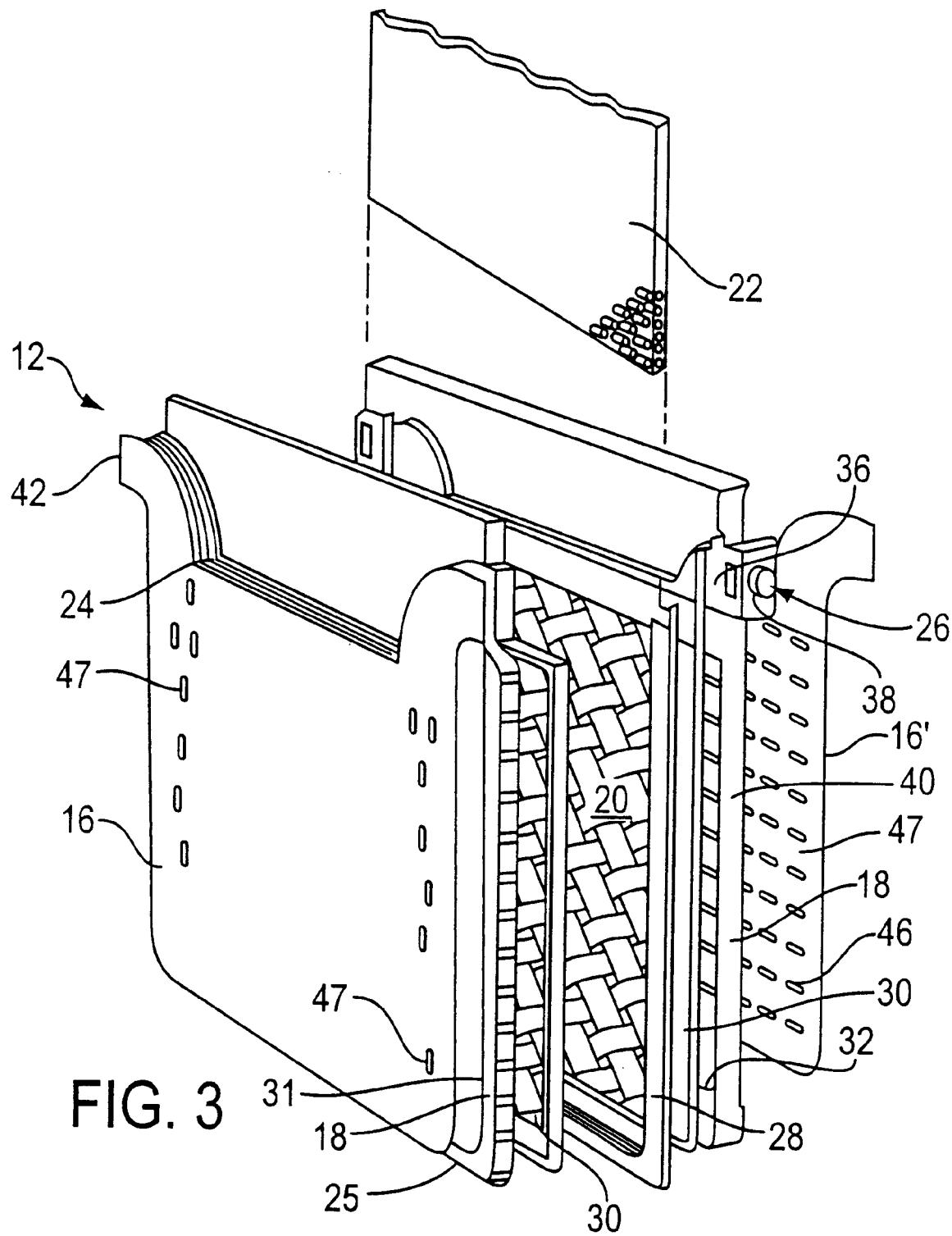
FIG. 3 is an exploded view of the cell shown in FIG. 2.

Referring now to FIGS. 2 & 3, there is seen in more detail one of the battery cells 12 contained in battery 10.

The cell 12 has a housing 14 having two outer major surfaces 16 and 16' and two spaced-apart inner walls 18. Inner walls 18 define a first inner chamber 20 for containing therein a zinc electrode 22, and in conjunction with outer major surfaces 16 define two outer chambers 24 for receiving reaction air 26.

In the shown embodiment, bottom 25 and opposing side surfaces 40, 44 of inner walls 18 form the base and sides of housing 14.

Zinc electrode 22 is advantageously formed of a generally planar electrically conductive skeletal member encompassed by an active metal component, comprising porous zinc particles formed into a static bed of slurry impregnated with an electrolyte. The zinc electrode 22, when in place, is retained in a u-shaped frame 28 and can be withdrawn and replaced by a new zinc electrode 22 when the used electrode is exhausted.

Outer surfaces 16 and 16' comprise plastic sheets 0.3 to 1.5 mm thick of sufficient strength for protection of said air electrode from physical damage during cell handling.

Preferred plastics include noryl and polypropylene, due to their light weight and excellent chemical resistance.

Two generally planar gas-permeable, but liquid-impermeable air electrodes 30 are positioned, one on each side of the zinc electrode 22. Each air electrode 30 is installed in a window-like opening 32 provided in each inner wall 18.

Each inner wall 18 is provided with a peripheral recess 31 sized to accept one of two outer major surfaces 16 and a window 32 to accept one of two air electrodes 30. The recesses 31 serve to position outer surfaces 16 and 16', seen in FIG. 3, and to facilitate the formation of an air-impermeable joint between said outer surfaces 16 and 16' and said peripheral recesses 31. Said joint can be made by using epoxy glue or by ultrasonic welding. Alternatively, said major outer surfaces 16 and 16' and inner walls 18 can be molded as a single integral unit.

An electrolyte 34, for example potassium hydroxide, is held in the first inner chamber 20 and contacts the zinc electrode 22 and air electrodes 30.

To provide oxygen required for cell operation, means 36 are provided for directing a flow of reaction air 26 into a first inlet 38 provided in a first outer side surface 40 of the cell housing 14. Reaction air flow divides to pass through both outer chambers 24 substantially in a uniform flow distribution across the outer faces of both air electrodes 30. Reaction air 26, minus the consumed oxygen, exits through a second outlet 42 provided in an opposite outer side surface 44 of the cell housing 14.

Reaction air 26 passing through the cell 12 is significantly heated in the cell 12 due to contact with the hot air electrode 30.

As stated, in the present invention, the heated reaction air 26 is cooled by cooling air 48 which flows along the outer surfaces 16 and 16' of each cell and effects cooling by heat transfer through said outer surfaces.

In the embodiment shown, cooling air flow directing means include a plurality of outward projections 46 which are provided on at least one of the outer surfaces, in the present embodiment shown only on rear outer surface 16'. Projections 46 act as spacers between adjacent cells and allow cooling air 48 to flow through a space 50, seen in FIG. 1 between two adjacently positioned cells 12 and 12a. For this reason it is sufficient to place projections 46 on only one of said interfacing outer surfaces, although obviously it is possible to provide such projections on both outer surfaces 16 and 16'.

Cooling air 48 does not enter the cell 12, but contacts the two interfacing outer major surfaces 16 and 16' of two interfacing adjacent cells 12 and 12a. Surfaces 16 and 16' are arranged to be in contact with and to cool reaction air 26 in each of the outer chambers 24. Thus, even though high flow rates of cooling air 48 are used, no carbon dioxide contamination of the cell 12 results therefrom. Cell heat is thus removed partially through the reaction air 26 directly, and partially through the cooling air 48 removing heat from the cell outer surfaces 16 and 16'. In a battery having cells 24 cm square, a minimum of 50 watts of heat is removed from each cell 12.

It will be realized that batteries according to the present invention, can also be used for motorcycles and other vehicles in situations wherein cooling air can flow between adjacent cells, as a result of air flow along the battery and between the cells as a result of the vehicle's motion, wherein such spacers or projections 46 are the only means necessary for directing cooling air flow between adjacent cells, while in other closed embodiments said means may include ducts, vents, blowers, and combinations thereof, etc.

Preferably, there are also provided on both of said outer surfaces 16 and 16' inwardly directed projections 47, which further assure the maintenance of the space within outer reaction chambers 24 for the flow of said reaction air, as described hereinbefore.

Figure 4:
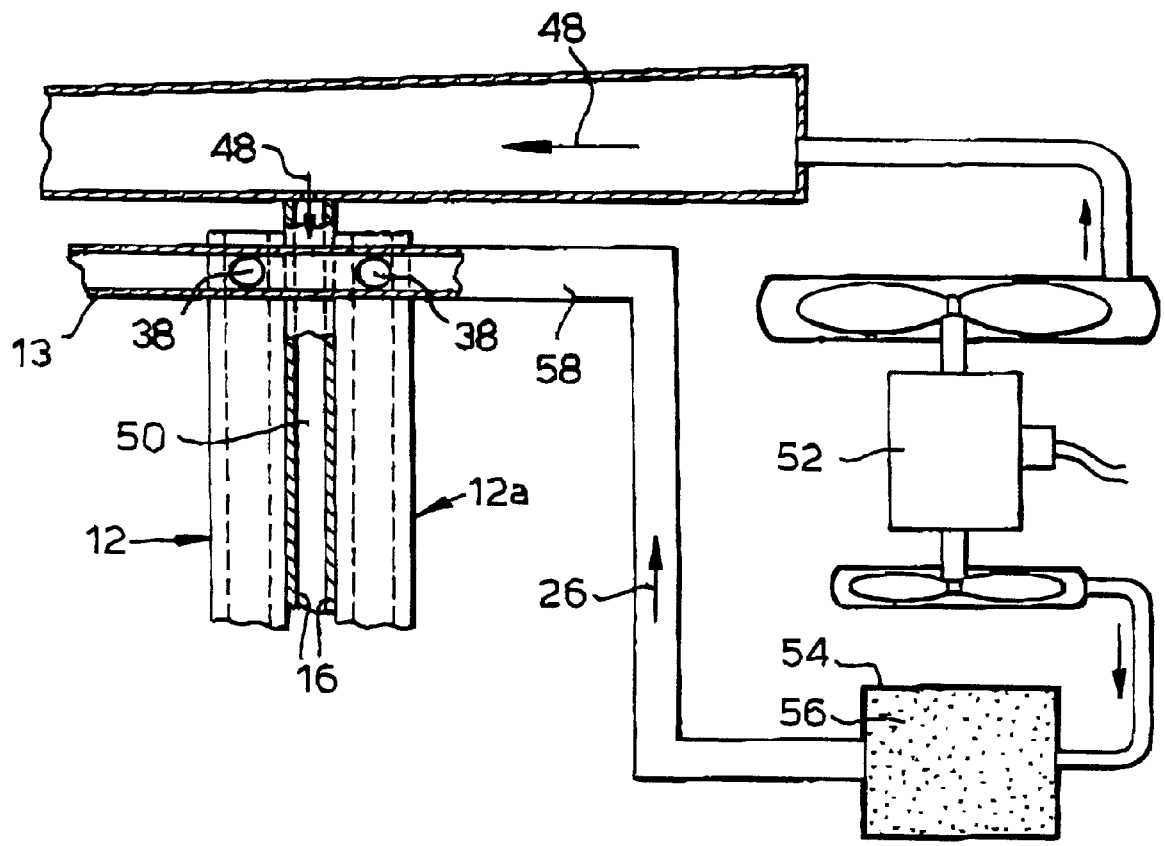
FIG. 4 is a schematic view of an embodiment showing a preferred arrangement of the air flows.

Seen in FIG. 4 is a preferred arrangement of the air flows. Advantageously cooling air flow directing means include blower means 52.

It has been explained that the cell 12 is exposed to two separate air flows, heat being transferred from the reaction air 26 to the cooling air 48. The two air flows in the present embodiment, originate from a single air blower 52. Reaction air 26 is supplied in sufficient quantity to operate the cells 12, while a larger quantity of cooling air 48 is used to extract unwanted heat from the reaction air 26.

Advantageously the flow rate of cooling air 48 exceeds the flow rate of reaction air 26 by a factor of at least two.

Preferably a scrubber 54 is arranged to remove carbon dioxide from the reaction air 26 before said reaction air 26 enters the cell 12. The scrubber 54 contains a $CO_2$-absorbent material 56, for example, granular alkali metal hydroxide or aqueous alkali metal hydroxide absorbed on a porous carrier. Premature exhaustion of material 56 is avoided by using the scrubber 54 only for reaction air 26. The larger quantities of cooling air 48 which flow over the outer surfaces 16 of the cell 12 do not go through the scrubber 54. The width of space 50 is shown exaggerated for illustrative purposes.

The figure shows a manifold 58 arranged to feed reaction air 26 to inlet 38 of each cell.

Figure 5:
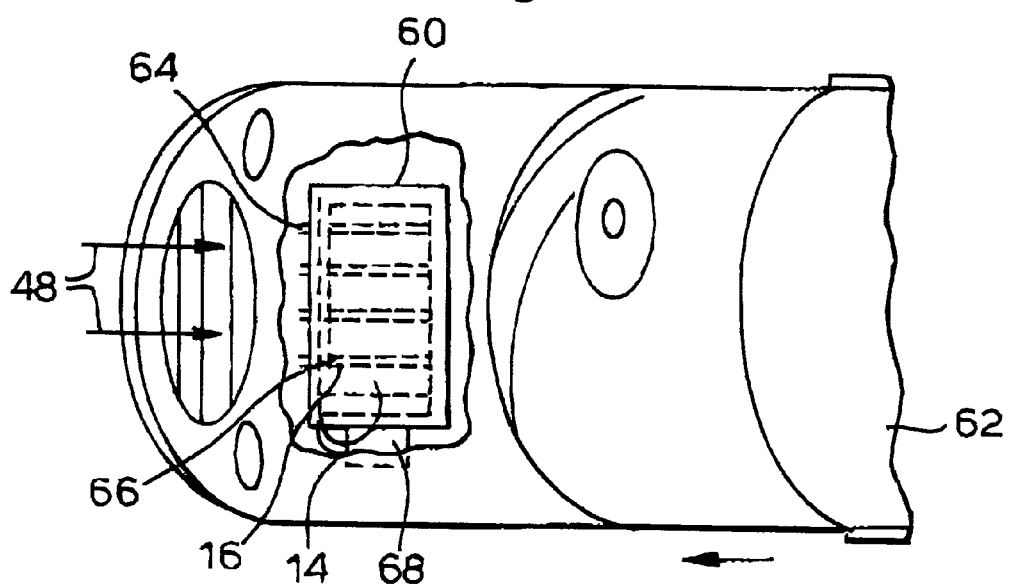
FIG. 5 is a plan view of an embodiment wherein a battery being used in a moving vehicle is provided with vents to collect cooling air.

FIG. 5 depicts an electrochemical zinc-air multi-cell battery 60 similar to that seen in FIG. 1. The battery 60, being used in a moving vehicle 62, is provided with vents 64 to collect cooling air 48. The battery 60 is oriented to bring the major faces such as the outer surface 16 of the cell housing 14 in line with the direction in which the vehicle 62 moves. Cooling air 48 flow directing means include vent means 66 provided in the cell housing 14 for directing natural air flow between cells. A small blower 68 for the provision of reaction air 26 is optional. The larger blower 54 previously described with reference to FIG. 4 is not required in the present embodiment, thus saving weight, cost and parasitic power consumption.

Seen in FIG. 6 is a cell detail of two spaced-apart inner walls 70, 72 which together form housing 14. A matching left 18L and a right inner wall 18R are arranged to interlink. The left inner wall 18L has an upper channel 70 formed in the top 72 of said left inner wall 18L. A thin tongue 74 of the right inner wall is shown engaged in channel 70. The left inner wall has a peripheral recess 104 extending along both sides and the bottom, recess 104 is best seen in FIG. 9. The right inner wall 18R is sized to fit into recess 104 and to be flush, when assembled, with the top edge 76 of channel 104. The interlinked walls 18L, 18R hold between them air electrodes, the zinc electrode and the electrolyte, as described with reference to FIGS. 2 and 3, but these components are omitted herein for purposes of clarity.

Seen in FIG. 7 is detail of a cell 88 provided with means for directing the flow of reaction are 26 substantially in a uniform flow distribution across outer faces of both air electrodes 30 seen in FIG. 3.

A series of substantially horizontal rails 90 is supported in a window-like opening 92 in inner wall 94. The spaces formed between rails 90 define upper and lower walls of horizontal ducts 96 for directing reaction are 26, which is received from first inlet 38. After passing between the rails 90, reaction air 26 is directed towards second outlet 42.

In the shown preferred embodiment, a plurality of webs 98 extend in a vertical direction and interlink and reinforce rails 90. The webs 98 further provide support for air electrodes 30, which are mechanically weak. A further benefit of the webs 98 is in the creation of a more turbulent air flow in horizontal ducts 96, thus improving both cell efficiency and cell cooling.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electrochemical zinc-air multi-cell battery, each cell being of the type provided with
   a housing having, two outer major surfaces, and two spaced-apart inner walls, said inner walls defining a first inner chamber for containing therein a zinc electrode, and in conjunction with said outer major surfaces defining two outer chambers for receiving reaction air;
   two generally planar, gas-permeable, but liquid-impermeable air electrodes, each of said electrodes being installed in a window-like opening provided in each of said inner walls;
   an electrolyte in contact with said zinc electrode and said air electrodes;
   means for directing a flow of said reaction air into a first inlet provided in a first outer side surface of said housing through both of said outer chambers substantially in a uniform flow distribution across the outer faces of both of said air electrodes, and out of a second outlet provided in an opposite outer side surface of said housing; and
   cooling air flow directing means for causing cooling air to flow between two adjacently positioned cells, along the outer faces of the major surfaces of two interfacing adjacent cells, said surfaces respectively being arranged to be in contact with and to cool said reaction air in each of the outer chambers bounded by said respective surfaces.

2. An electrochemical zinc-air multi-cell battery according to claim 1, wherein bottom and opposing side surfaces of said inner walls form the base and sides of said housing respectively.

3. An electrochemical zinc-air multi-cell battery according to claim 1, wherein said cooling air flow directing means include blower means.

4. An electrochemical zinc-air multi-cell battery according to claim 1, wherein said cooling air flow directing means include vent means provided in said housing for directing natural air flow between said cells.

5. An electrochemical zinc-air multi-cell battery according to claim 1, wherein the flow rate of said cooling air exceeds the flow rate of said reaction air by a factor of at least two.

6. An electrochemical zinc-air multi-cell battery according to claim 1, wherein one of said inner walls is provided with an opening sized to receive said second inner wall to form a sealed unit therein.

7. An electrochemical zinc-air multi-cell battery according to claim 1, wherein said outer major surfaces of said cell housing are made of plastic material.

8. An electrochemical zinc-air multi-cell battery according to claim 1, further including a scrubber arranged to remove carbon dioxide from said reaction air before said reaction air enters said cells.

9. An electrochemical zinc-air multi-cell battery according to claim 1, wherein said means for directing said flow of reaction air substantially in a uniform flow distribution across said outer faces of both of said air electrodes comprises a series of substantially horizontal rails supported in said window-like opening in said inner wall, the spaces formed between said rails defining upper and lower walls of horizontal ducts directing said reaction air received from said first inlet towards said second outlet.

10. An electrochemical zinc-air multi-cell battery according to claim 9, further comprising a plurality of webs extending in a vertical direction and interlinking and reinforcing said rails, and further providing support for said air electrodes, while creating a turbulent air flow in said horizontal ducts.

11. An electrochemical zinc-air multi-cell battery according to claim 1, wherein each of said inner walls is provided with a peripheral recess sized to accept one of said two outer major surfaces and a window-like opening sized to accept one of said two air electrodes, said recess and said opening serving to position said electrode and said surface and to facilitate the formation of an air-impermeable joint between said outer surface and said peripheral recess.

12. An electrochemical zinc-air multi-cell battery according to claim 1, wherein said outer major surfaces are joined to said inner walls by ultrasonic welding.

13. An electrochemical zinc-air multi-cell battery according to claim 1, further provided with a manifold arranged to feed reaction air to the sides of each cell.

14. An electrochemical zinc-air multi-cell battery according to claim 1, wherein said outer surfaces comprise plastic sheets 0.3 to 1.5 mm thick of sufficient strength for protection of said air electrode from physical damage during cell handling.

* * * * *